United States Patent
Smith et al.

(10) Patent No.: US 10,055,556 B2
(45) Date of Patent: *Aug. 21, 2018

(54) TECHNOLOGIES FOR AUTHENTICATING A USER OF A COMPUTING DEVICE BASED ON AUTHENTICATION CONTEXT STATE

(71) Applicant: Intel Corporation, Santa Clara, CA (US)

(72) Inventors: Ned M. Smith, Beaverton, OR (US); Nathan Heldt-Sheller, Portland, OR (US); Micah J. Sheller, Hillsboro, OR (US); Kevin C. Wells, Portland, OR (US); Hannah L. Scurfield, London (GB); Nathaniel J. Goss, Portland, OR (US); Sindhu Pandian, Portland, OR (US); Brad H. Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,950

(22) Filed: Sep. 26, 2015

(65) Prior Publication Data

US 2016/0188853 A1 Jun. 30, 2016

Related U.S. Application Data

(63) Continuation of application No. 14/583,671, filed on Dec. 27, 2014.

(51) Int. Cl.
*G06F 7/04* (2006.01)
*G06F 21/31* (2013.01)
(Continued)

(52) U.S. Cl.
CPC .............. *G06F 21/31* (2013.01); *G06F 21/53* (2013.01); *H04L 9/3226* (2013.01);
(Continued)

(58) Field of Classification Search
CPC ......... G06F 21/31; G06F 21/575; H04L 63/08
See application file for complete search history.

(56) References Cited

U.S. PATENT DOCUMENTS 8,886,217 B2 11/2014 Reitter et al.
9,032,498 B1 * 5/2015 Ben Ayed ............... G06F 21/35
726/9
(Continued)

OTHER PUBLICATIONS

Ruddock, David, "[Trusted Butts] New 'On-Body Detection' Smart Lock Mode in Android Seems to Be Hitting Some Devices," Android Police, Mar. 20, 2015, available at http://www.androidpolice.com/2015/03/20/trusted-butts-new-on-body-detection-smart-lock-mode-in-android-seems-to-be-hitting-some-devices/ , accessed Dec. 1, 2015, 4 pages.
(Continued)

*Primary Examiner* — Ali Abyaneh
(74) *Attorney, Agent, or Firm* — Barnes & Thornburg LLP (57) ABSTRACT

Technologies for authenticating a user of a computing device based on an authentication context state includes generating context state outputs indicative of various context states of a mobile computing device based on sensor data generated by sensors of the mobile computing device. An authentication manager of the computing device implements an authentication state machine to authenticate a user of the computing device. The authentication state machine includes a number of authentication states, and each authentication state includes one or more transitions to another authentication state. Each of the transitions is dependent upon a context state output. The computing device may also
(Continued)

include a device security manager, which implements a security state machine that includes a number of security states. Transition between security states is dependent upon the present authentication state of the user. The device security manager may implement a different security function in each security state.

20 Claims, 6 Drawing Sheets

(51) Int. Cl.
  *H04W 12/06* (2009.01)
  *G06F 21/53* (2013.01)
  *H04L 9/32* (2006.01)
  *H04W 88/02* (2009.01)

(52) U.S. Cl.
  CPC ..... *H04W 12/06* (2013.01); *G06F 2221/2105* (2013.01); *G06F 2221/2111* (2013.01); *G06F 2221/2147* (2013.01); *H04L 2209/127* (2013.01); *H04L 2209/805* (2013.01); *H04W 88/02* (2013.01)

(56) References Cited

U.S. PATENT DOCUMENTS

| | | | |
|---|---|---|---|
| 2010/0146599 A1* | 6/2010 | Padmanabha | G06F 21/335 726/5 |
| 2011/0283338 A1 | 11/2011 | Yang | |
| 2012/0280917 A1 | 11/2012 | Toksvig | |
| 2013/0102283 A1 | 4/2013 | Lau | |
| 2013/0104187 A1 | 4/2013 | Weidner | |
| 2014/0337243 A1 | 11/2014 | Dutt et al. | |
| 2015/0221151 A1* | 8/2015 | Bacco | G07C 9/00158 340/5.83 |
| 2016/0300053 A1* | 10/2016 | Kidron | G06F 21/316 |

OTHER PUBLICATIONS

Carlon, Kris, "Nexus 9 tips: the first 9 things you need to do," AndroidPit, available at https://www.androidpit.com/nexus-9-tips, accessed Dec. 1, 2015, 13 pages.

Williams, Martyn, "Android's smart lock now detects when you carry your phone", PC Advisor, Mar. 20, 2015, available at http://www.pcadvisor.co.uk/news/mobile-phone/3605027/androids-smart-lock-now-detects-when-you-carry-your-phone/, accessed Dec. 1, 2015, 4 pages.

International Search Report for PCT/US15/061873, dated Apr. 1, 2016 (3 pages).

Written Opinion for PCT/US15/061873, dated Apr. 1, 2016 (9 pages).

* cited by examiner

FIG. 10 ly, the user may pass around the mobile computing device to each acquaintance to allow the person to personally view or consume the content. Additionally, when the mobile computing device is left unattended, such as during charging, the risk of a security event increases.
TECHNOLOGIES FOR AUTHENTICATING A USER OF A COMPUTING DEVICE BASED ON AUTHENTICATION CONTEXT STATE

CROSS-REFERENCE TO RELATED APPLICATION

The present application is a continuation application of U.S. application Ser. No. 14/583,671, entitled "TECHNOLOGIES FOR AUTHENTICATING A USER OF A COMPUTING DEVICE BASED ON AUTHENTICATION CONTEXT STATE," which was filed on Dec. 27, 2014.

BACKGROUND

Mobile computing devices are becoming ubiquitous personal tools that provide users access to data, networks, and other functionality nearly anywhere the user may travel. As familiarity, and even dependency, on mobile computing devices increases, the security risks associated with the mobile computing devices increase as well. In particular, many common uses of mobile computing devices result in a reduction of a user's physical control over the mobile computing device. For example, the user may desire to share pictures, video, or other content with other individuals by placing the mobile computing device on a surface to facilitate common viewing by all. Alternative Some mobile computing devices have attempted to improve security on the device through frequent user authentication requests. For example, if no activity is detected on the mobile computing device for a duration of time, the mobile computing device may prompt the user to actively authenticate before allowing the user to interact with the mobile computing device. The more frequent such user authentication request, the greater the security of the mobile computing device. However, repeated user authentication is inconvenient, can reduce user efficiency, and can breed poor security habits (e.g., by causing the user to select easily memorable passcodes).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
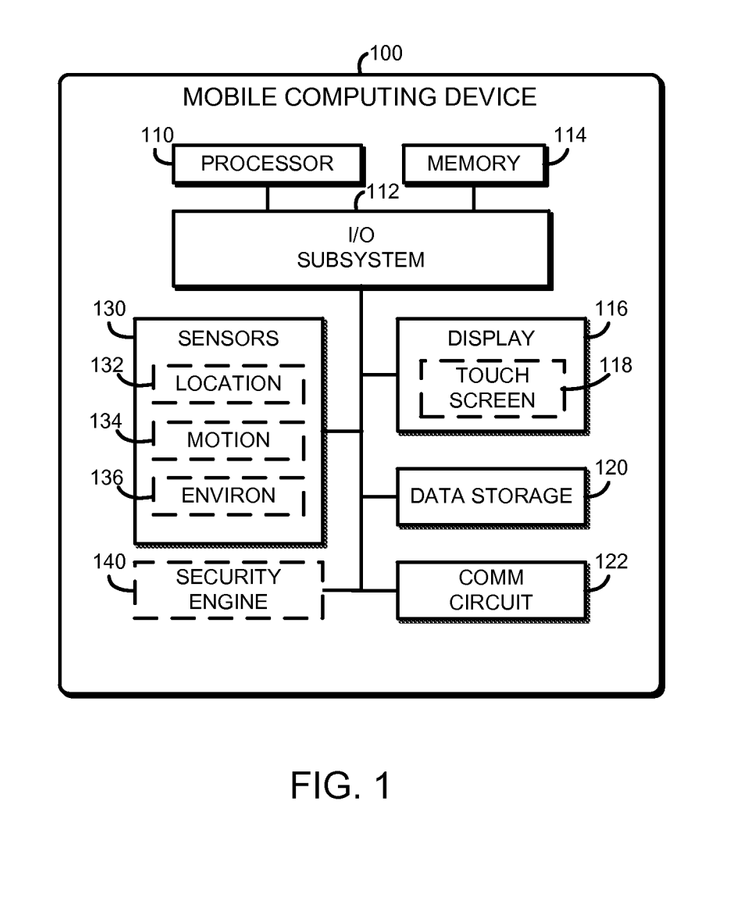
FIG. 1 is a simplified diagram of at least one embodiment of a mobile computing device for authenticating a user.

Referring now to FIG. 1, an illustrative mobile computing device 100 for authenticating a user includes one or more sensors 130 that generate various sensor data indicative of a present context of the mobile computing device 100. In use, as discussed below, the mobile computing device 100 is configured to authenticate a user based on the present context of the mobile computing device 100, which is determined by an array of context classifiers. To do so, each of the context classifiers receives sensor data as input and generates a context state output indicative of various corresponding context characteristics of the mobile computing device 100. For example, one context classifier may generate a context state output indicative of whether the mobile computing device 100 is presently in a pocket or otherwise carried by the user. Another context classifier may generate a context state output indicative of the present location of the mobile computing device 100. Of course, any type of context state of the mobile computing device 100 may be used to authenticate the user as discussed in more detail below.

To facilitate the authentication of the user, the mobile computing device 100 implements one or more authentication state machines. Each authentication state machine includes a number of different authentication states (e.g., authenticated, not-authenticated, delegated, etc.) with transitions between the authentication states. Transition between the various authentication states is dependent upon the present context state of the mobile computing device 100. For example, if a context state output of the context classifiers indicates that the mobile computing device 100 is presently carried by the user, the present authentication may be an authenticated state. However, if the corresponding context state output changes to a context state output that indicates the mobile computing device 100 is no longer carried by the user, such a context change may cause a transition in the authentication state of the mobile computing device 100 from an authenticated state to an unauthenticated state. In this way, the mobile computing device 100 utilizes the authentication state machine to manage the present authentication of the user and transitions between the various authentication states based on the present context of the mobile computing device 100.

In the illustrative embodiment, the mobile computing device 100 also implements one or more security state machines to control the current security state and associated security function of the mobile computing device 100. Similar to the authentication state machine, each security state machine includes a number of different security states (e.g., a display-locked security state, a display-unlocked security state, a swipe-to-dismiss security state, etc.) with transitions between the security states. Transition between the various security states is dependent upon the present authentication state of the user of the mobile computing device 100. For example, if the present authentication state of the user is "authenticated," the present security state of the security state machine may be "display-unlocked." However, if the present authentication state transitions from "authenticated" to "not-authenticated" (e.g., based on an indication that the mobile computing device 100 is no longer being carried by the user), the security state machine may likewise transition from "display-unlocked" to "display-locked." It should be appreciated that the mobile computing device 100 may implement one or more security functions (e.g., locking the display with varying levels of security challenges) in each security state, which may be dependent on the particular security state. In this way, the security of the mobile computing device 100 may be managed based on the authentication state of the user, which is based on the present context of the mobile computing device 100. Managing the security of the mobile computing device 100 based on the present context of the mobile computing device 100 may reduce the need or frequency of active security challenges, which can improve the user's efficiency and overall experience with the mobile computing device 100.

The mobile computing device 100 may be embodied as any type of computing device capable of determining a local context and performing the additional functions described herein. For example, the mobile computing device 100 may be embodied as or otherwise include, without limitation, a smart phone, smart eyeglasses, a smart watch, smart clothing, a smart appliance, a head-mounted display unit, a tablet computer, a notebook computer, a laptop computer, a cellular telephone, a handset, a messaging device, a multiprocessor system, a processor-based system, a consumer electronic device, and/or any other computing device capable of authenticating a user based on the context of the mobile computing device 100. As shown in FIG. 1, the illustrative computing device 100 includes a processor 110, an I/O subsystem 112, a memory 114, a display 116, a data storage 120, a communication circuit 122, and sensors 130. Of course, the mobile computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 114, or portions thereof, may be incorporated in the processor 110 in some embodiments The processor 110 may be embodied as any type of processor capable of performing the functions described herein. For example, the processor 110 may be embodied as a single or multi-core processor(s), a single or multi-socket processor, a digital signal processor, a microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile computing device 100, on a single integrated circuit chip.

The display 116 may be embodied as any type of display capable of displaying images, data, and/or other information to a user including, but not limited to, a liquid crystal display (LCD), a light emitting diode (LED), a plasma display, a cathode ray tube (CRT), or other type of display device. Additionally, the display(s) 132 may be of any size or shape and have any suitable resolution, color, and/or have any other feature or quality commonly found in a display. In some embodiments, the display 116 may include a touchscreen 118 to facilitate user interaction. The touchscreen 118 may utilize any suitable touchscreen technology to receive tactile input from the user including, but not limited to, resistive, capacitive, and/or acoustic touchscreen technology.

The data storage 120 may be embodied as any type of device or devices configured for the short-term or long-term storage of data. For example, the data storage 120 may include any one or more memory devices and circuits, memory cards, hard disk drives, solid-state drives, or other data storage devices.

The communication circuit 122 may be embodied as any communication circuit, device, or collection thereof, capable of enabling communications between the computing device 100 and other devices. To do so, the communication circuit 122 may be configured to use any one or more communication technology and associated protocols (e.g., Ethernet, Bluetooth®, Wi-Fi®, WiMAX, etc.) to effect such communication. In some embodiments, as discussed below, the communication circuit 122 may include a short-range communication circuit, such as a Bluetooth® or Near Field Communication (NFC) circuit, to detect other computing devices within proximity to the mobile computing device 100.

The sensors 130 may be embodied as any type of sensor or collection of sensors capable of generating sensor data indicative of a context of the mobile computing device 100 or from which a context of the mobile computing device 100 can be determine. The mobile computing device 100 may include any number of sensors 130 depending on the particular implementation and/or type of mobile computing device 100. For example, the sensors 130 may include one or more location sensors 132 configured to generate sensor data indicative of the present location of the mobile computing device 100 such as, for example, a global positioning system (GPS) sensor or the like. The sensors 130 may additionally or alternatively include one or more motion sensors 134 configured to generate sensor data indicative of movement or orientation of the mobile computing device 100 such as, for example, an accelerometer, gyroscope, magnetometer, or the like. Additionally or alternatively, the sensors 130 may include one or more environment sensors configured to generate sensor data indicative of a local environment of the mobile computing device 100 such as a camera, a microphone, a temperature sensor, a short-range communication circuit, and/or the like.

In some embodiments, the mobile computing device 100 may also include a security engine 140. The security engine 140 may be embodied as any hardware component(s) and/or software component (e.g., processor instructions extensions) capable of establishing a trusted execution environment (TEE) on the computing device 100. In particular, the security engine 140 may support executing code and/or accessing data that is independent and secure from other code executed by the computing device 100. It should be appreciated that the security engine 140 and/or processor 110 may utilize any suitable technology to established the trusted execution environment including, for example, Intel® Software Guard Extensions (SGX), Trusted Execution Engine (TEE), Trusted Platform Module (TPM), Intel® Converged Security Engine (CSE), ARM® TrustZone®, Intel® Manageability Engine, Intel® Chaabi Security Engine, Intel® virtualization instructions, and/or other techniques and mechanisms for the security engine 140 and/or processor 110 for establishing a secure and trusted execution environment.

In some embodiments, the computing device 100 may further include one or more peripheral devices (not shown). Such peripheral devices may include any type of peripheral device commonly found in a computer device, for example, a hardware keyboard, input/output devices, peripheral communication devices, and/or other peripheral devices.

Figure 2:
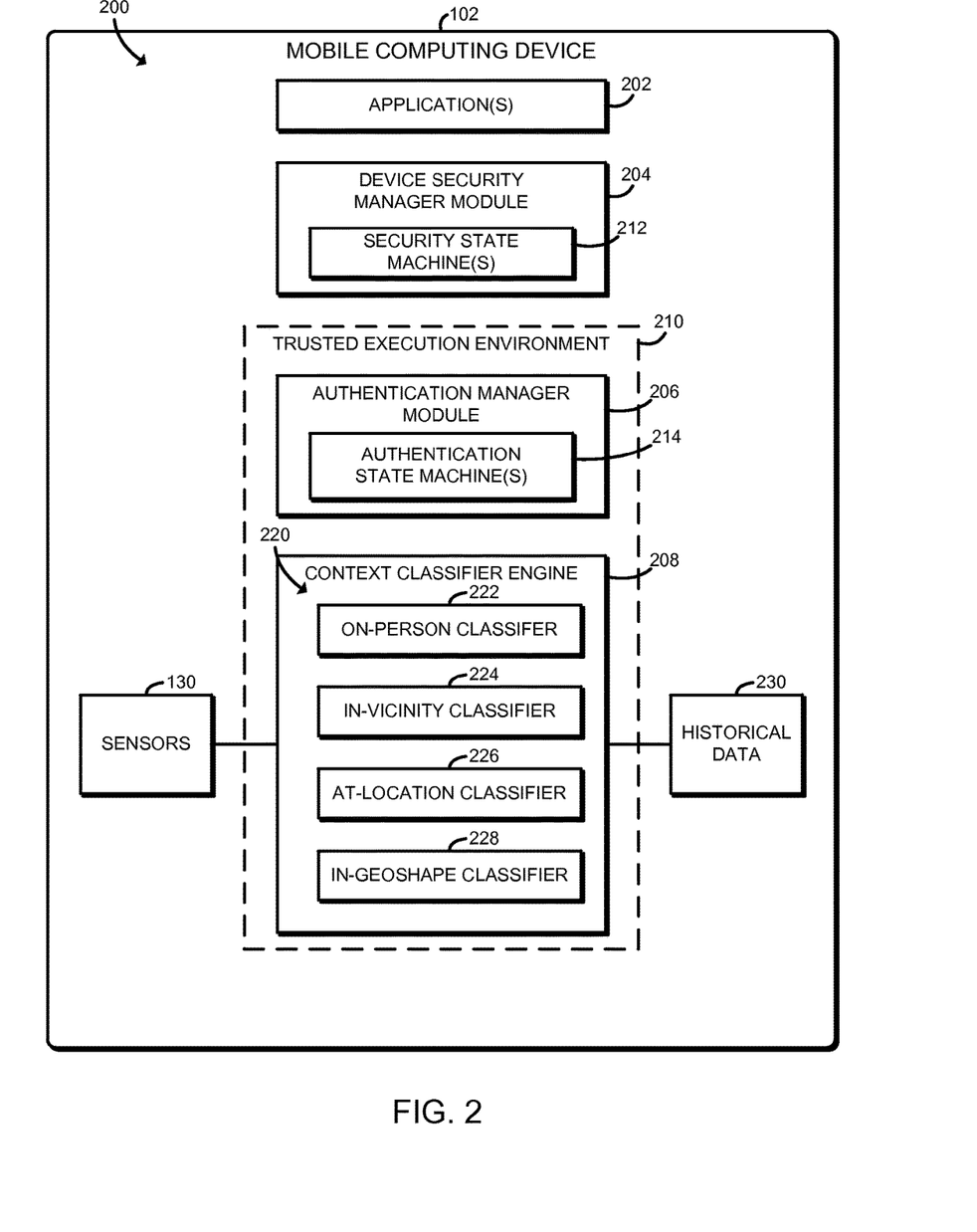
FIG. 2 is a simplified diagram of at least one embodiment of an environment that may be established by the mobile computing device of FIG. 1.

Referring now to FIG. 2, in use, the computing device 100 may establish an environment 200. The illustrative environment 200 includes one or more applications 202, a device security manager module 204, an authentication manager module 206, and a context classifier engine 208. Each of the modules and other components of the environment 200 may be embodied as firmware, software, hardware, or a combination thereof. For example the various modules, logic, and other components of the environment 200 may form a portion of, or otherwise be established by, the processor 110, the I/O subsystem 112, an SoC, or other hardware components of the computing device 100. As such, in some embodiments, any one or more of the modules of the environment 200 may be embodied as a circuit or collection of electrical devices (e.g., a device security manager circuit, an authentication manager circuit, a context classifier engine circuit, etc.).

The mobile computing device 100 may execute various types and numbers of applications 202 during use. For example, the mobile computing device 100 may execute an image gallery application, a web browser, a camera application, a text-based communication application, and/or any other type of application commonly executed by mobile computing devices. Some of the applications 202 may require, or otherwise interact with, security functions of the mobile computing device 100. For example, an image gallery application may require the user to authenticate to view secured images and/or re-authenticate after some period of inactivity. To do so, any one of the applications 202 may interface with the device security manager module 204 as discussed below.

The device security manager module 204 manages the security and related security functions of the mobile computing device 100 (or an individual account on the mobile computing device 100). The device security manager module 204 may be embodied as any type of resource manager capable of operating on the mobile computing device 100. For example, in some embodiments, the device security manager module 204 may be embodied as a KeyguardManager for the Android™ operating system, but other resource managers may be used in other embodiments. In use, the device security manager module 204 determines when and whether to present a security challenge to a user of the mobile computing device 100. The security functions performed by the mobile computing device 100 may be embodied as any type of security function commonly employed by a computing device including, for example, locking the display 116 with a passcode/password challenge, locking the display 116 with a swipe-to-dismiss challenge, and/or other security function. In some embodiments, the device security manager module 204 may utilize multiple levels of the same security function (e.g., a passcode challenges having various levels of difficulty).

In use, the device security manager module 204 determines and tracks the present security state of the mobile computing device 100 via use of a security state machine 212. The security state machine may include any number of individual security states, each of which define a different security state or condition (e.g., locked, unlocked, etc.) of the mobile computing device 100. However, unlike typical resource managers that determine the present security state of a mobile computing device 100 based on singular user actions (e.g., unlock action) and/or sensor data (e.g., unlock timeout), the device security manager module 204 determines the present security state of the mobile computing device 100 based on the present authentication state of user authentication, which may itself be based on various context states of the mobile computing device 100 as discussed in more detail below. It should be appreciated that the device security manager module 204 may implement or utilize multiple security state machines based on users, locations, and/or other criteria.

The authentication manager module 206 manages and tracks the present authentication of the user of the mobile computing device 100 based on various context states of the mobile computing device 100. To do so, similar to the device security manager module 204, the authentication manager module 206 implements an authentication state machine 214. As discussed in more detail below, the authentication state machine 214 includes a number of different authentication states of the user based on the present context states of the mobile computing device 100. For example, the authentication state machine 214 may include an "authenticated" state, a "not-authenticated" state, and/or a "delegated" state (e.g., authenticated but not currently in direct possession/control of the primary user). The authentication state machine 214 may include any number of different authentication states depending on the particular implementation, level of desired security granularity, number of authorized users of the mobile computing device 100 and/or other factors. The transitions between the various authentication states are determined or based on one or more context states of the mobile computing device 100. For example, a change in the context state indicative of whether the mobile computing device 100 is on the person of the user may cause a transition from an "authenticated" state to an "unauthenticated" state or vice-versa. It should be appreciated that the authentication manager module 206 may implement or utilize multiple authentication state machines 214 based on the number of authorized users, desired implementation, and/or other criteria.

As discussed above, the present authentication state of the user of the mobile computing device 100 is determined based on the various context states of the mobile computing device 100. The context classifier engine 208 is configured to determine or generate context state outputs indicative of the various context states of the mobile computing device 100. To do so, the context classifier engine 208 utilizes one or more classifiers to determine each context state. The context classifier engine 208 may include any number of classifiers based on the number of desired context states to be determined. Each classifier may be embodied as a classification rule, or set of classification rules, which may be generated via an associated machine learning classification algorithm (e.g., a support vector machine algorithm, logistic regression algorithm, etc.) and associated training set of historical sensor data 230. Each classifier of the context classifier engine 208 receives sensor data from one or more sensors 130 and generates a context state output indicative of an associated context of the mobile computing device 100. The context state output may be embodied as a binary or n-ary context state. For example, an at-home classifier may generate a "true" context state based on sensor data indicating that the mobile computing device 100 is located at the home of the user.

In the illustrative embodiment of FIG. 2, the context classifier engine 208 includes an on-person classifier 222, an in-vicinity classifier 224, an at-location classifier 226, and an in-geoshape classifier 228. Of course, the context classifier engine 208 may include additional or other classifiers in other embodiments to generate context state outputs indicative various context states of the mobile computing device. Illustratively, the on-person classifier 222 receives sensor data indicative of an orientation of the mobile computing device 100 (e.g., is the device 100 level or not) and motion of the mobile computing device 100 (e.g., has the device 100 been relatively motionless for a period of time) and generates a context state output indicative of whether the mobile computing device 100 is present being carried by the user. The in-vicinity classifier 224 receives sensor data indicative of a communication link (e.g., a short-ranged communication link) with another computing device and generates a context state output indicative of whether the mobile computing device 100 is within a reference distance, or vicinity, of the other computing device. The at-location classifier 226 receives sensor data indicative of the present location of the mobile computing device 100 and generates a context state output indicative of whether the mobile computing device 100 is at a reference location (e.g., whether the mobile computing device 100 is at home, at work, etc.). Similarly, the in-geoshape classifier 228 receives sensor data indicative of the present location of the mobile computing device 100 and generates a context state output indicative of whether the mobile computing device 100 is within a reference geo-location, which may have a coarser or finer granularity than the at-location classifier (e.g., whether the mobile computing device 100 is within a particular room or building).

In some embodiments, the authentication manager module 206 and the context classifier engine 208 may be established in, or otherwise operate in, a trusted execution environment 210. The trusted execution environment 210, which may be established by the security engine 140, ensures that the determination of the context state of the mobile computing device 100 and the authentication of the user is protected from outside sources and not accidently disclosed to an untrusted application 202, for example. Additionally, in some embodiments, the sensors 130 may provide the generated sensor data to the context classifier engine 208 via a trusted input/output path, which may further increase the security of the authentication process.

Figure 3:
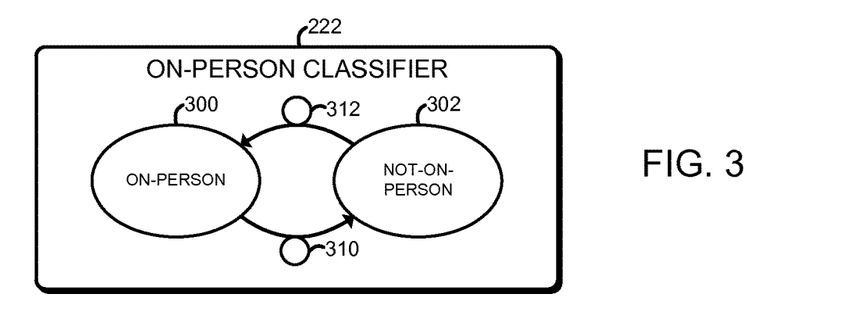
FIGS. 3-6 are simplified diagrams of various context classifiers that may be used by the mobile computing device of FIGS. 1 and 2.

Referring now to FIGS. 3-6, illustrative embodiments of the context classifiers 222, 224, 226, and 228 are shown. As shown in FIG. 3, the illustrative on-person classifier 222 includes an "on-person" context state 300 and a "not-on-person" context state 302. Transition from the "on-person" context state 300 to the "not-on-person" context state 302 is based on a guard condition 310, and transition from the "not-on-person" context state 302 to the "on-person" context state 300 is based on a guard condition 312. Each guard condition 310, 312 may be embodied as particular sensor data requirements that must be established to transition from one context state to another. For example in the illustrative embodiment, the guard conditions 310, 312 are based on the orientation and motion of the mobile computing device 100 (e.g., whether the mobile computing device 100 has level and/or still for threshold amount of time). Of course, in other embodiments, other sensor data may be used as basis for the guard conditions 310, 312.

Figure 4:
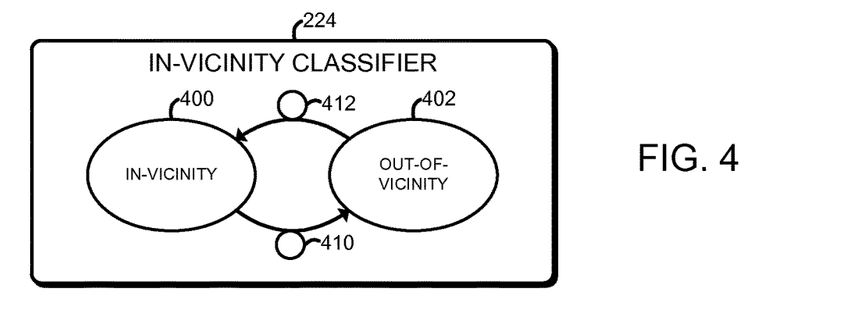

As shown in FIG. 4, the illustrative in-vicinity classifier 224 includes an "in-vicinity" context state 400 and an "out-of-vicinity" context state 402. Transition from the "in-vicinity" context state 400 to the "out-of-vicinity" context state 402 is based on a guard condition 410, and transition from the "out-of-vicinity" context state 402 to the "in-vicinity" context state 400 is based on a guard condition 412. Again, each guard condition 410, 412 may be embodied as particular sensor data requirements that must be established to transition from one context state to another. For example, in the illustrative embodiment, the guard conditions 410, 412 are based on whether a short-range communication link has been established or has timed out with another local computing device. Of course, in other embodiments, other sensor data may be used as basis for the guard conditions 410, 412.

Figure 5:
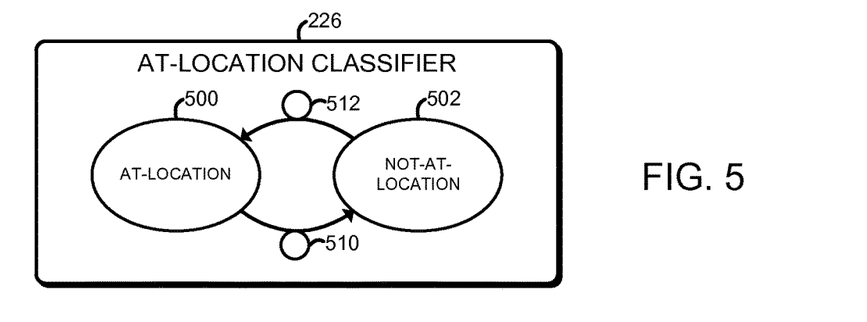

As shown in FIG. 5, the illustrative at-location classifier 226 includes an "at-location" context state 500 and a "not-at-location" context state 502. Transition from the "at-location" context state 500 to the "not-at-location" context state 502 is based on a guard condition 510, and transition from the "not-at-location" context state 502 to the "at-location" context state 500 is based on a guard condition 512. Again, each guard condition 510, 512 may be embodied as particular sensor data requirements that must be established to transition from one context state to another. For example, in the illustrative embodiment, the guard conditions 510, 512 are based sensor data indicative of the present location of the mobile computing device 100. Of course, in other embodiments, other sensor data may be used as a basis for the guard conditions 510, 512.

Figure 6:
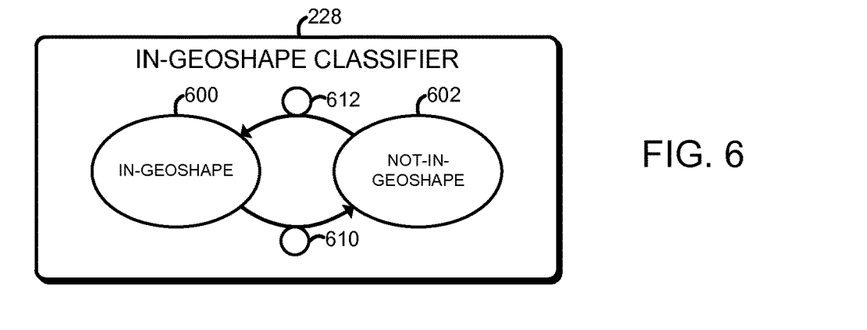

As shown in FIG. 6, the illustrative in-geoshape classifier 228 includes an "in-geoshape" context state 600 and a "not-in-geoshape" context state 602. Transition from the "in-geoshape" context state 600 to the "not-in-geoshape" context state 602 is based on a guard condition 610, and transition from the "not-in-geoshape" context state 602 to the "in-geoshape" context state 600 is based on a guard condition 612. Again, each guard condition 610, 612 may be embodied as particular sensor data requirements that must be established to transition from one context state to another. For example, in the illustrative embodiment, the guard conditions 610, 612 are based sensor data indicative of the present location of the mobile computing device 100, similar to guard conditions 610, 612. Of course, in other embodiments, other sensor data may be used as basis for the guard conditions 610, 612.

Figure 7:
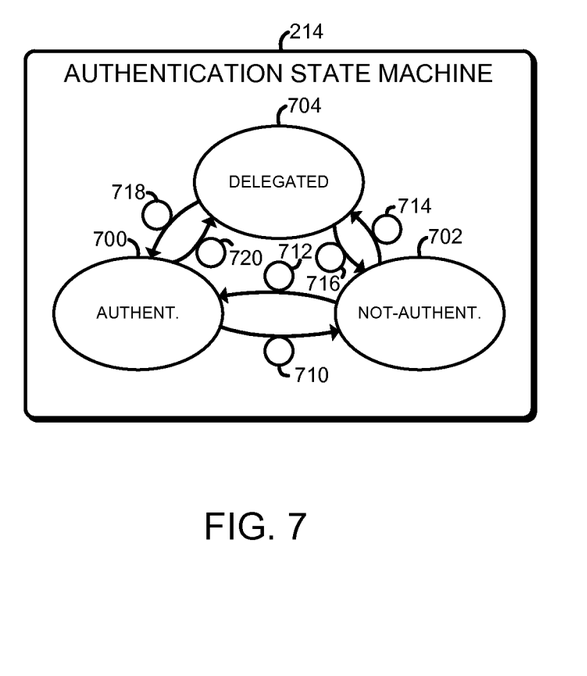
FIG. 7 is a simplified diagram of at least one embodiment of a security state machine that may be implemented by the mobile computing device of FIGS. 1 and 2.

As discussed above, the various context state outputs from the classifiers of the context classifier engine 208 influence or control the transitions of the authentication state machine 214. An illustrative authentication state machine 214 is shown in FIG. 7 and includes an "authenticated" authentication state 700, a "not-authenticated" authentication state 702, and a "delegated" authentication state 704. Of course, the authentication state machine 214 may include additional or other authentication states in other embodiments. The transitions between the individual authentication states 700, 702, 704 are based on corresponding guard conditions 710, 712, guard conditions 714, 716, and guard conditions 718, 720. Each guard conditions 710, 712, 714, 716, 718, 720 may be based on one or more context state outputs generated by the on-person classifier 222, the in-vicinity classifier 224, the at-location classifier 226, and/or the in-geoshape classifier 228 depending on the particular implementation, the particular user, desired security level, and/or other criteria. For example, in one embodiment the guard condition 720 from the "authenticated" state 700 to the "delegated" authentication state 704 may be based on context state output of the on-person classifier 222 and the in-vicinity classifier 224. For example, the guard condition 720 may be satisfied when the on-person classifier 222 generates a context state output indicating that the mobile computing device 100 is being carried by the user (or another individual), but the in-vicinity classifier 224 generates a context state output indicating that that mobile computing device 100 is not within the threshold proximity of another computing device.

It should be appreciated that the transition represented by the guard condition 720 is dependent on the present authentication state, as well as the context state outputs of the guard conditions 720. That is, the authentication state machine transactions from the "authenticated" state 700 to the "delegated" state 704 based on the on-person classifier 222 and the in-vicinity classifier 224, but may not transition to the "delegated" state 704 from the "not-authenticated" authentication state 702 based on the same context state outputs of the on-person classifier 222 and the in-vicinity classifier 224. For example, if the user of the mobile computing device 100 was authenticated and the authentication manager module 206 now detects that the mobile computing device 100 is out of vicinity of the additional computing device, the authentication manager module 206 may infer the user has delegated the mobile computing device 100 to another user (e.g., a friend of the user). In this way, the authentication manager module 206 utilizes authentication states and changes in context states of the mobile computing device 100 to determine a new authentication state for the user.

Figure 8:
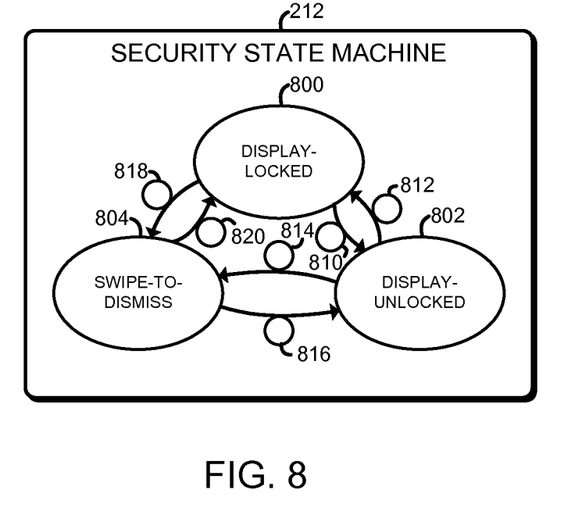
FIG. 8 is a simplified diagram of at least one embodiment of an authentication state machine that may be implemented by the mobile computing device of FIGS. 1 and 2.

As discussed above, the various authentication states of the authentication state machine 214 influence or control the transitions of the security state machine 212. An illustrative security state machine 212 is shown in FIG. 8 and includes a "display-locked" security state 800, a "display-unlock" security state 802, and a "swipe-to-dismiss" security state 804. Of course, the security state machine 212 may include additional or other security states in other embodiments. The transitions between the individual security states 800, 802, 804 are based on corresponding guard conditions 810, 812, guard conditions 814, 816, and guard conditions 818, 820. Each guard conditions 810, 812, 814, 816, 818, 820 may be based the present authentication state determined by the authentication state machine 214 and/or other criteria. For example, the guard condition 818 may be satisfied when the authentication state machine 214 indicates that the user is authenticated or authenticated for the current location. Of course, some of the guard conditions 810, 812, 814, 816, 818, 820 may be satisfied by actions of the user or other criteria in addition to or alternative to an authentication state. For example, the guard condition 810 may be satisfied by the user successfully responding to a passcode challenge or the like. Regardless, it should be appreciated that the security state machine 212 relies on the present authentication state of the user as determined based on the authentication state machine 214, which utilizes the context state outputs generated by the classifiers of the context classifier engine 208.

Figure 9:
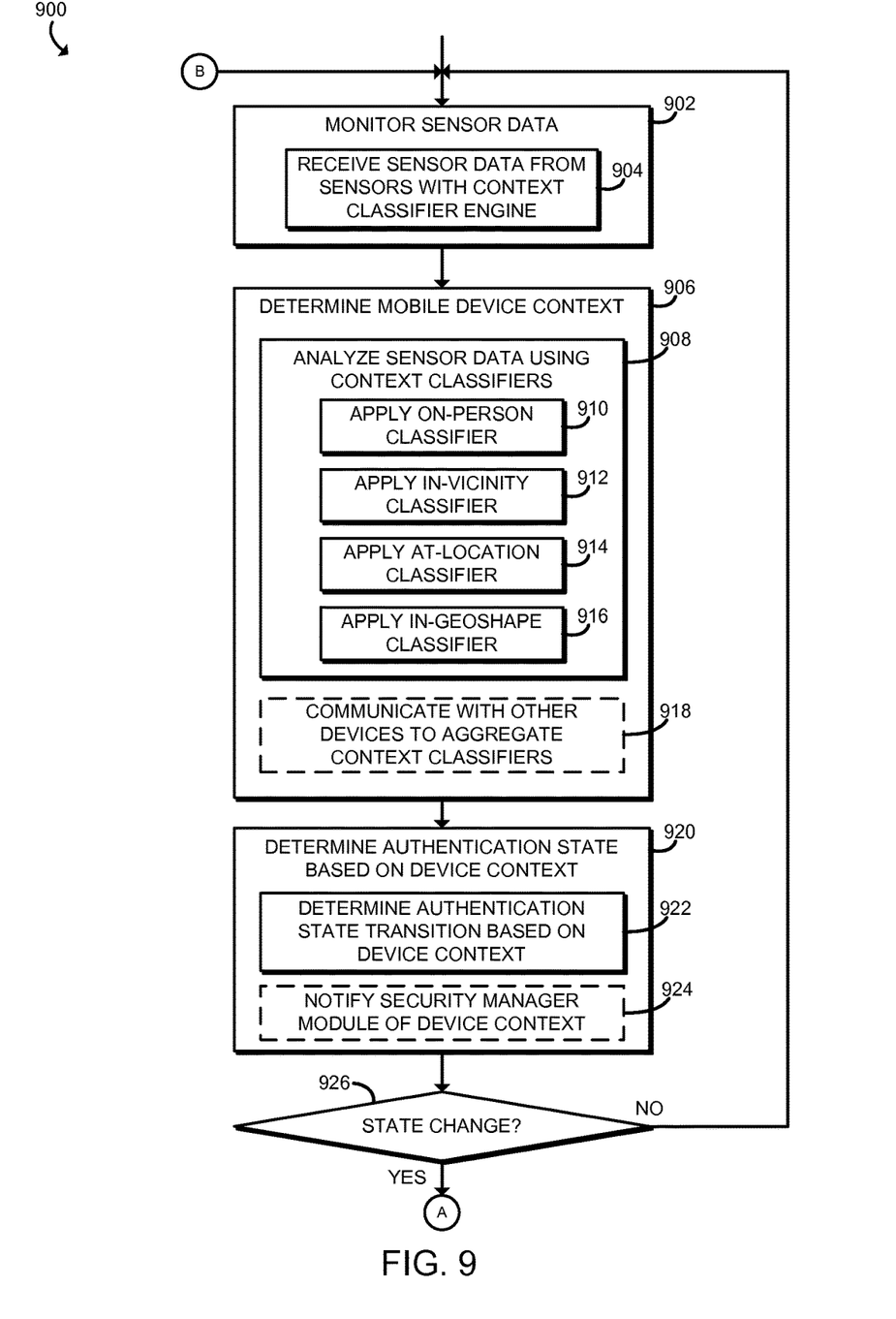
FIGS. 9 and 10 are a simplified flow diagram of at least one embodiment of a method for authenticating a user that may be executed by the mobile computing device of FIGS. 1 and 2.
Figure 10:
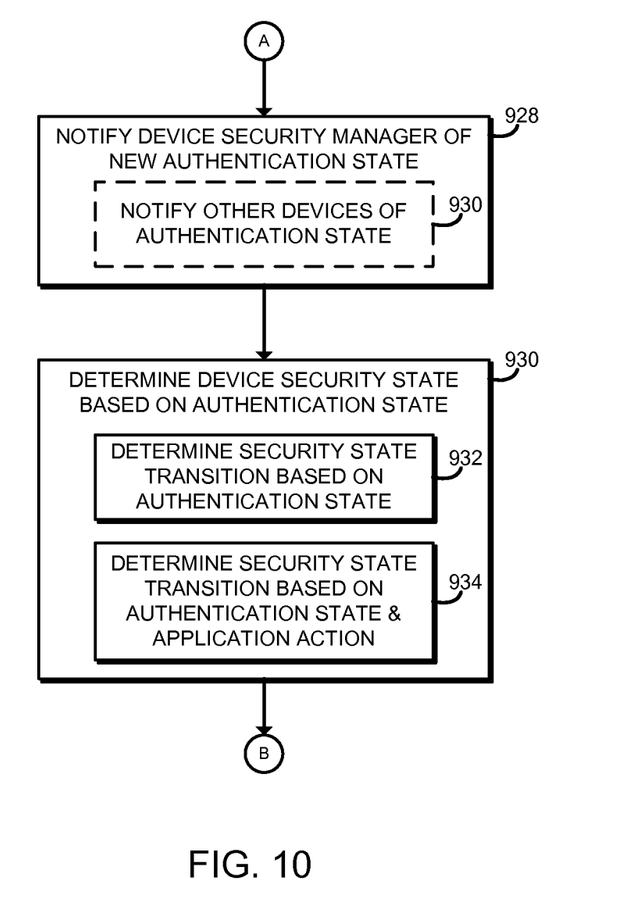

Referring now to FIGS. 9 and 10, in use, the mobile computing device 100 may execute a method 900 for authenticating a user. The method 900 begins with block 902 in which the mobile computing device 100 monitors the sensors 130. For example, the mobile computing device 100 may periodically or responsively sample the sensor data generated by the sensors 130. In block 904, the context classifier engine 208 receives the sensor data from the sensors 130. As discussed above, the sensors 130 may include any type of sensors including, for example, location sensor 132, motion sensor 134, and/or environment sensors 136.

In block 906, the context classifier engine 208 determines the various context parameters of the mobile computing device 100 based on the present sensor data. To do so, the context classifier engine 208 analyzes the sensor data using the various context classifiers. For example, in block 910, the on-person classifier 222 may receive appropriate sensor data from the sensors 130 and generate a context state output indicative of whether the mobile computing device 100 is presently being carried by the user. In block 912, the in-vicinity classifier 224 may receive appropriate data from the sensors 130 and a context state output indicative of whether the mobile computing device 100 is within a reference distance, or vicinity, of the other computing device. In block 914, the at-location classifier 226 may receive appropriate data from the sensors 130 and generate a context state output indicative of whether the mobile computing device 100 is at a reference location. In block 916, the in-geoshape classifier 228 may receive appropriate sensor data from the sensors 130 and generate a context state output indicative of whether the mobile computing device 100 is within a reference geo-location. Again, as discussed above, the context classifier engine 208 may include additional or other classifiers in other embodiments, each of which may receive additional or other sensor data as an input for classification.

In some embodiments, in block 918, the context classifier engine 208 may communicate with other computing device to aggregate context classifier output data. For example, in some embodiments, sensor data generated by another computing device and/or context data generated by another computing may be received by the mobile computing device 100 and provided to the context classifier engine 208 for use in determining the various context states of the mobile computing device 100 as discussed above.

After the present context states of the mobile computing device 100 have been determined in block 906, the method 900 advances to block 920 in which the authentication manager module 206 determines the present authentication state of the user. To do so, as discussed above, the authentication manager module 206 utilizes the authentication state machine 214, which is influenced by the present context states of the mobile computing device 100. As such, in block 922, the authentication manager module 206 receives the various context state outputs generated in block 906 and determines whether a transition to a new authentication state of the authentication state machine 214 has occurred based on the received context state outputs. Additionally, in some embodiments, the authentication manager module 206 may notify the device security manager module 204 of the various determined context states of the mobile computing device 100.

If no authentication state transition has occurred in block 926, the method 900 loops back to block 902 in which the mobile computing device 100 continues to monitor the sensor data generated by the sensors 130. However, if an authentication state transition has occurred, the method 900 advances to block 928 of FIG. 10. In block 928, the authentication manager module 206 notifies the device security manager module 204 of the new authentication state (e.g., "authenticated," "not-authenticated," "delegated," etc.). Additionally, in some embodiments in block 930, the authentication manager module 206 notifies other computing devices of the authentication state of the user of the mobile computing device 100. In this way, the mobile computing device 100 may share the user's authentication state so that the user need not authenticate to the other computing device.

As discussed above, the present authentication state of the user influences the security state of the mobile computing device 100. As such, in block 930, the device security manager module 204 determines the present security state of the mobile computing device 100. To do so, as discussed above, the device security manager module 204 utilizes the security state machine 212, which is influenced by the authentication state of the user determined by the authentication manager module 206 and associated authentication state machine 214. As such, in block 932, the device security manager module 204 determines whether a transition to a new security state has occurred based on the new authentication state of the user. If a new authentication state has occurred, the device security manager module 204 may perform any security function (e.g., prompt the user for a passcode, lock the display 116 with a swipe screen, etc.) associated with the new security state. Additionally, in some embodiments, the device security manager module 204 may determine whether a transition in security states of the security state machine 212 has occurred based on the present authentication state of the user and an action taken by or requested by an application 202 executed by the mobile computing device 100. For example, an application 202 may request a security function. In response, the device security manager module 204 may determine the level of security function required based on the present authentication state of the user. Regardless, after the present security state has been determined in block 930, the method loops back to block 902 in which the mobile computing device 100 continues monitoring the sensors 130.

It should be appreciated that, by use of the authentication state machine(s) 214 and the security state machine(s) 212, user authentication and the security state of the mobile computing device 100 may be determined without reliance on a specific sensor, singular user action, or the like. Rather, the context of the mobile computing device 100 may be determined based on an array of sensor data, both historical and present, to drive the user authentication. As such, user authentication is independent of any specific sensor or action, which may typically cause a security function to be performed.

Additionally, it should be appreciated that the technologies described herein facilitate the continuous or continual context authentication of the user, which may form a proxy for standard or typical authentication requirements. For example, a resource of the mobile computing device 100 may remaining accessible to the user, even after an authorization period or token has expired, because the context-based authentication of the user described herein establishes user proximity to the resource has remained constant or otherwise above a minimum level. Such resources may be embodied as any type of resource available on the computing device 100, such as a logon to the mobile computing device 100, an application executed on the mobile computing device 100, and/or content available from the mobile computing device 100. Additionally, as discussed above, the mobile computing device 100 may assert or confirm user authentication to other computing devices or services. As such, the user context-based authentication performed by the mobile computing device 100 may be further used as proxy authentication for resources available on other computing devices including, for example, logons to personal computing devices, web services, web accounts, cloud resources, resources distributed across various services, devices, or hosts, networks of interconnected devices or sensors, or any other resource, device, or service requiring user authentication.

Examples

Illustrative examples of the devices, systems, and methods disclosed herein are provided below. An embodiment of the devices, systems, and methods may include any one or more, and any combination of, the examples described below.

Example 1 includes a mobile computing device for authenticating a user, the mobile computing device comprising a plurality of sensors to generate sensor data indicative of a context of the mobile computing device; a context classifier engine comprising a plurality of context classifiers, wherein each context classifier is to generate, based on sensor data from at least one of the plurality of sensors, a context state output indicative of a corresponding context of the mobile computing device; and an authentication manager module to determine an authentication state of a user of the mobile computing device based on an authentication state machine, wherein the authentication state machine includes a plurality of authentication states and each authentication state has at least one transition to another authentication state, wherein each transition between authentication states is dependent upon at least one context state output of the context classifier engine.

Example 2 includes the subject matter of Example 1, and wherein the authentication manager module is to determine a present authentication state based on the authentication state machine and the context state outputs of the context classifier engine.

Example 3 includes the subject matter of any of Examples 1 and 2, and wherein the authentication state machine is to transition from the present authentication state to a new authentication state in response to a change in at least one context state output of the context classifier.

Example 4 includes the subject matter of any of Examples 1-3, and wherein the authentication manager module is to notify another computing device of the new authentication state.

Example 5 includes the subject matter of any of Examples 1-4, and wherein the authentication manager module is to notify a device security manager module of the mobile computing device in response to the transition to the new authentication state.

Example 6 includes the subject matter of any of Examples 1-5, and wherein the device security manager module is to determine a present security state of the mobile computing device based on the new authentication state and implement a corresponding security function on the mobile computing device based on the present security state.

Example 7 includes the subject matter of any of Examples 1-6, and wherein the authentication state machine includes an authenticated state to indicate that the present user has been authenticated, a not-authenticated state to indicate that the present user has not been authenticated, and a delegated state to indicate that the present user has been delegated a level of authentication from an authenticated user.

Example 8 includes the subject matter of any of Examples 1-7, and further including a device security manager module to implement one of a plurality of security functions based on a security state machine, wherein the security state machine includes a plurality of security states and each security state includes at least one transition to another security state, wherein each transition between security states is dependent upon the present authentication state of the authentication state machine.

Example 9 includes the subject matter of any of Examples 1-8, and wherein each transition between security states is dependent upon the present authentication state of the authentication state machine and an instruction received from an application executed by the mobile computing device.

Example 10 includes the subject matter of any of Examples 1-9, and wherein the security state machine includes a display-locked security state in which the device security manager module locks the display with a passcode security function; a swipe-to-dismiss security state in which the device security manager module locks a display of the mobile computing device with a swipe security function, and a display-unlocked security state in which the device security manager module unlocks the display.

Example 11 includes the subject matter of any of Examples 1-10, and wherein the context classifier engine and the authentication manger module are established in a trusted execution environment.

Example 12 includes the subject matter of any of Examples 1-11, and wherein each of the plurality of context classifiers generate a context state output based on sensor data from at least one of the plurality of sensors and historical sensor data.

Example 13 includes the subject matter of any of Examples 1-12, and wherein the context classifier engine is further to communicate with another computing device to aggregate additional context state outputs generated by the another computing device, wherein the additional context state outputs are indicative of a corresponding context of the mobile computing device.

Example 14 includes the subject matter of any of Examples 1-13, and wherein the plurality of context classifiers includes an on-person classifier to generate a context state output indicative of whether the mobile computing device is presently carried by the user.

Example 15 includes the subject matter of any of Examples 1-14, and wherein the on-person classifier generates the context state output indicative of whether the mobile computing device is presently carried by the user based on (i) sensor data indicative of the orientation of the mobile computing device and (ii) sensor data indicative of movement of the mobile computing device.

Example 16 includes the subject matter of any of Examples 1-15, and wherein the plurality of context classifiers includes an in-vicinity classifier to generate a context state output indicative of whether the mobile computing device is a reference distance to another computing device.

Example 17 includes the subject matter of any of Examples 1-16, and wherein the in-vicinity classifier generates the context state output indicative of whether the mobile computing device is a reference distance to another computing device based on sensor data indicative of a communication with the another computing device.

Example 18 includes the subject matter of any of Examples 1-17, and wherein the plurality of context classifiers includes an at-location classifier to generate a context state output indicative of whether the mobile computing device is located at a reference location.

Example 19 includes the subject matter of any of Examples 1-18, and wherein the at-location classifier generates the context state output indicative of whether the mobile computing device is located at a reference location based on sensor data indicative of the present location of the mobile computing device.

Example 20 includes the subject matter of any of Examples 1-19, and wherein the plurality of context classifiers includes an in-geo-shape classifier to generate a context state output indicative of whether the mobile computing device is located within a reference geo-spatial area.

Example 21 includes the subject matter of any of Examples 1-20, and wherein the in-geo-shape classifier generates the context state output indicative of whether the mobile computing device is located within a reference geo-spatial area based on sensor data indicative of the present location of the mobile computing device.

Example 22 includes the subject matter of any of Examples 1-21, and wherein the plurality of sensors include at least one of a location sensor to generate sensor data indicative of a location of the mobile computing device, a motion sensor to generate sensor data indicative of movement of the mobile computing device, or an environment sensor to generate sensor data indicative of a local environment of the mobile computing device.

Example 23 includes the subject matter of any of Examples 1-22, and further wherein the authentication manager module is to notify another computing device of the determined authentication state of the user to authenticate the user to the another computing device to facilitate access by the user to a resource available on the another computing device.

Example 24 includes the subject matter of any of Examples 1-23, and wherein to notify the another computing device comprises to authenticate the user to the another computing device to reduce an occurrence of active user authentication by the another computing device for access to the resource.

Example 25 includes the subject matter of any of Examples 1-24, and wherein the resource available on the another computing device comprises at least one of a logon to the another computing device, a service provided by the another computing device, a web service, a web account access, and/or a cloud or network resource.

Example 26 includes a method for authenticating a user of a mobile computing device, the method comprising generating, by a plurality of sensors of the mobile computing device, sensor data indicative of a context of the mobile computing device; generating, by each context classifier of a plurality of context classifiers of a context classifier engine of the mobile computing device, a context state output indicative of a corresponding context of the mobile computing device based on sensor data from at least one of the plurality of sensors; determining, by an authentication manager module of the mobile computing device, an authentication state of a user of the mobile computing device based on an authentication state machine, wherein the authentication state machine includes a plurality of authentication states and each authentication state has at least one transition to another authentication state, wherein each transition between authentication states is dependent upon at least one context state output of the context classifier engine.

Example 27 includes the subject matter of Example 26, and wherein determining an authentication state of the user comprises determining a present authentication state of the user based on the authentication state machine and the context state outputs of the context classifier engine.

Example 28 includes the subject matter of any of Examples 26 and 27, and further including transitioning the authentication state machine from the present authentication state to a new authentication state in response to a change in at least one context state output of the context classifier.

Example 29 includes the subject matter of any of Examples 26-28, and further including notifying another computing device of the new authentication state.

Example 30 includes the subject matter of any of Examples 26-29, and further including notifying a device security manager module of the mobile computing device in response to the transition to the new authentication state.

Example 31 includes the subject matter of any of Examples 26-30, and further including determining, by the device security manager module, a present security state of the mobile computing device based on the new authentication state and implement a corresponding security function on the mobile computing device based on the present security state.

Example 32 includes the subject matter of any of Examples 26-31, and wherein the authentication state machine includes an authenticated state to indicate that the present user has been authenticated, a not-authenticated state to indicate that the present user has not been authenticated, and a delegated state to indicate that the present user has been delegated a level of authentication from an authenticated user.

Example 33 includes the subject matter of any of Examples 26-32, and further including implementing, by a device security manager module of the mobile computing device, one of a plurality of security functions based on a security state machine, wherein the security state machine includes a plurality of security states and each security state includes at least one transition to another security state, wherein each transition between security states is dependent upon the present authentication state of the authentication state machine.

Example 34 includes the subject matter of any of Examples 26-33, and where each transition between security states of the security state machine is dependent upon the present authentication state of the authentication state machine and an instruction received from an application executed by the mobile computing device.

Example 35 includes the subject matter of any of Examples 26-34, and wherein the security state machine includes a display-locked security state in which the device security manager module locks the display with a passcode security function; a swipe-to-dismiss security state in which the device security manager module locks a display of the mobile computing device with a swipe security function, and a display-unlocked security state in which the device security manager module unlocks the display.

Example 36 includes the subject matter of any of Examples 26-35, and further including establishing the context classifier engine and the authentication manger module in a trusted execution environment of the mobile computing device.

Example 37 includes the subject matter of any of Examples 26-36, and wherein generating the context state output comprises generating, by each context classifier, a context state output based on sensor data from at least one of the plurality of sensors and historical sensor data.

Example 38 includes the subject matter of any of Examples 26-37, and further including communicating, by the mobile computing device, with another computing device to aggregate additional context state outputs generated by the another computing device, wherein the additional context state outputs are indicative of a corresponding context of the mobile computing device.

Example 39 includes the subject matter of any of Examples 26-38, and further including generating, by an on-person classifier of the plurality of context classifiers, a context state output indicative of whether the mobile computing device is presently carried by the user.

Example 40 includes the subject matter of any of Examples 26-39, and wherein generating the context state output indicative of whether the mobile computing device is presently carried by the user comprises generating the context state output indicative of whether the mobile computing device is presently carried by the user based on (i) sensor data indicative of the orientation of the mobile computing device and (ii) sensor data indicative of movement of the mobile computing device.

Example 41 includes the subject matter of any of Examples 26-40, and further including generating by an in-vicinity classifier of the plurality of context classifiers, a context state output indicative of whether the mobile computing device is a reference distance to another computing device.

Example 42 includes the subject matter of any of Examples 26-41, and wherein generating the context state output indicative of whether the mobile computing device is a reference distance to another computing device comprises generating the context state output indicative of whether the mobile computing device is a reference distance to another computing device based on sensor data indicative of a communication with the another computing device.

Example 43 includes the subject matter of any of Examples 26-42, and further including generating, by at-location classifier of the plurality of context classifiers, a context state output indicative of whether the mobile computing device is located at a reference location.

Example 44 includes the subject matter of any of Examples 26-43, and wherein generating the context state output indicative of whether the mobile computing device is located at a reference location comprises generating the context state output indicative of whether the mobile computing device is located at a reference location based on sensor data indicative of the present location of the mobile computing device.

Example 45 includes the subject matter of any of Examples 26-44, and further including generating, by an in-geo-shape classifier of the plurality of context classifiers, a context state output indicative of whether the mobile computing device is located within a reference geo-spatial area.

Example 46 includes the subject matter of any of Examples 26-45, and wherein generating the context state output indicative of whether the mobile computing device is located within a reference geo-spatial area comprises generating the context state output indicative of whether the mobile computing device is located within a reference geo-spatial area based on sensor data indicative of the present location of the mobile computing device.

Example 47 includes the subject matter of any of Examples 26-46, and wherein the plurality of sensors include at least one of a location sensor to generate sensor data indicative of a location of the mobile computing device, a motion sensor to generate sensor data indicative of movement of the mobile computing device, or an environment sensor to generate sensor data indicative of a local environment of the mobile computing device.

Example 48 includes the subject matter of any of Examples 26-47, and further including notifying another computing device of the determined authentication state of the user to authenticate the user to the another computing device to facilitate access by the user to a resource available on the another computing device.

Example 49 includes the subject matter of any of Examples 26-48, and wherein notifying the another computing device comprises authenticating the user to the another computing device to reduce an occurrence of active user authentication by the another computing device for access to the resource.

Example 50 includes the subject matter of any of Examples 26-49, and wherein the resource available on the another computing device comprises at least one of a logon to the another computing device, a service provided by the another computing device, a web service, a web account access, and/or a cloud or network resource.

Example 51 includes one or more computer-readable storage media comprising a plurality of instructions stored thereon that, in response to execution, cause a computing device to perform the method of any of Examples 26-50.

Example 52 includes a mobile computing device for authenticating a user, the mobile computing device comprising means for generating, by a plurality of sensors of the mobile computing device, sensor data indicative of a context of the mobile computing device; means for generating, by each context classifier of a plurality of context classifiers of a context classifier engine of the mobile computing device, a context state output indicative of a corresponding context of the mobile computing device based on sensor data from at least one of the plurality of sensors; means for determining, by an authentication manager module of the mobile computing device, an authentication state of a user of the mobile computing device based on an authentication state machine, wherein the authentication state machine includes a plurality of authentication states and each authentication state has at least one transition to another authentication state, wherein each transition between authentication states is dependent upon at least one context state output of the context classifier engine.

Example 53 includes the subject matter of Example 52, and wherein the means for determining an authentication state of the user comprises means for determining a present authentication state of the user based on the authentication state machine and the context state outputs of the context classifier engine.

Example 54 includes the subject matter of any of Examples 52 and 53, and further including means for transitioning the authentication state machine from the present authentication state to a new authentication state in response to a change in at least one context state output of the context classifier.

Example 55 includes the subject matter of any of Examples 52-54, and further including means for notifying another computing device of the new authentication state.

Example 56 includes the subject matter of any of Examples 52-55, and further including means for notifying a device security manager module of the mobile computing device in response to the transition to the new authentication state.

Example 57 includes the subject matter of any of Examples 52-56, and further including means for determining, by the device security manager module, a present security state of the mobile computing device based on the new authentication state and implement a corresponding security function on the mobile computing device based on the present security state.

Example 58 includes the subject matter of any of Examples 52-57, and wherein the authentication state machine includes an authenticated state to indicate that the present user has been authenticated, a not-authenticated state to indicate that the present user has not been authenticated, and a delegated state to indicate that the present user has been delegated a level of authentication from an authenticated user.

Example 59 includes the subject matter of any of Examples 52-58, and further including means for implementing, by a device security manager module of the mobile computing device, one of a plurality of security functions based on a security state machine, wherein the security state machine includes a plurality of security states and each security state includes at least one transition to another security state, wherein each transition between security states is dependent upon the present authentication state of the authentication state machine.

Example 60 includes the subject matter of any of Examples 52-59, and where each transition between security states of the security state machine is dependent upon the present authentication state of the authentication state machine and an instruction received from an application executed by the mobile computing device.

Example 61 includes the subject matter of any of Examples 52-60, and wherein the security state machine includes a display-locked security state in which the device security manager module locks the display with a passcode security function; a swipe-to-dismiss security state in which the device security manager module locks a display of the mobile computing device with a swipe security function, and a display-unlocked security state in which the device security manager module unlocks the display.

Example 62 includes the subject matter of any of Examples 52-61, and further including means for establishing the context classifier engine and the authentication manger module in a trusted execution environment of the mobile computing device.

Example 63 includes the subject matter of any of Examples 52-62, and wherein the means for generating the context state output comprises means for generating, by each context classifier, a context state output based on sensor data from at least one of the plurality of sensors and historical sensor data.

Example 64 includes the subject matter of any of Examples 52-63, and further including means for communicating, by the mobile computing device, with another computing device to aggregate additional context state outputs generated by the another computing device, wherein the additional context state outputs are indicative of a corresponding context of the mobile computing device.

Example 65 includes the subject matter of any of Examples 52-64, and further including means for generating, by an on-person classifier of the plurality of context classifiers, a context state output indicative of whether the mobile computing device is presently carried by the user.

Example 66 includes the subject matter of any of Examples 52-65, and wherein the means for generating the context state output indicative of whether the mobile computing device is presently carried by the user comprises means for generating the context state output indicative of whether the mobile computing device is presently carried by the user based on (i) sensor data indicative of the orientation of the mobile computing device and (ii) sensor data indicative of movement of the mobile computing device.

Example 67 includes the subject matter of any of Examples 52-66, and further including means for generating by an in-vicinity classifier of the plurality of context classifiers, a context state output indicative of whether the mobile computing device is a reference distance to another computing device.

Example 68 includes the subject matter of any of Examples 52-67, and wherein the means for generating the context state output indicative of whether the mobile computing device is a reference distance to another computing device comprises means for generating the context state output indicative of whether the mobile computing device is a reference distance to another computing device based on sensor data indicative of a communication with the another computing device.

Example 69 includes the subject matter of any of Examples 52-68, and further including means for generating, by at-location classifier of the plurality of context classifiers, a context state output indicative of whether the mobile computing device is located at a reference location.

Example 70 includes the subject matter of any of Examples 52-69, and wherein the means for generating the context state output indicative of whether the mobile computing device is located at a reference location comprises means for generating the context state output indicative of whether the mobile computing device is located at a reference location based on sensor data indicative of the present location of the mobile computing device.

Example 71 includes the subject matter of any of Examples 52-70, and further including means for generating, by an in-geo-shape classifier of the plurality of context classifiers, a context state output indicative of whether the mobile computing device is located within a reference geo-spatial area.

Example 72 includes the subject matter of any of Examples 52-71, and wherein the means for generating the context state output indicative of whether the mobile computing device is located within a reference geo-spatial area comprises means for generating the context state output indicative of whether the mobile computing device is located within a reference geo-spatial area based on sensor data indicative of the present location of the mobile computing device.

Example 73 includes the subject matter of any of Examples 52-72, and wherein the plurality of sensors include at least one of a location sensor to generate sensor data indicative of a location of the mobile computing device, a motion sensor to generate sensor data indicative of movement of the mobile computing device, or an environment sensor to generate sensor data indicative of a local environment of the mobile computing device.

Example 74 includes the subject matter of any of Examples 52-73, and further including means for notifying another computing device of the determined authentication state of the user to authenticate the user to the another computing device to facilitate access by the user to a resource available on the another computing device.

Example 75 includes the subject matter of any of Examples 52-74, and wherein the means for notifying the another computing device comprises means for authenticating the user to the another computing device to reduce an occurrence of active user authentication by the another computing device for access to the resource.

Example 76 includes the subject matter of any of Examples 52-75, and wherein the resource available on the another computing device comprises at least one of a logon to the another computing device, a service provided by the another computing device, a web service, a web account access, and/or a cloud or network resource.

The invention claimed is:

1. One or more non-transitory, computer-readable storage media comprising a plurality of instructions stored thereon that, when executed, cause a mobile computing device to:
determine a context state of a mobile computing device based on sensor data comprising orientation data and motion data from one or more sensors of the mobile computing device, wherein the context state indicates whether the mobile computing device is presently in a pocket, in a handbag, or otherwise carried by a user of the mobile computing device and wherein the orientation data is indicative of an orientation of the mobile computing device and the motion data is indicative of a motion of the mobile computing device;
prompt the user to enter a response to a user authentication challenge;

enter a first device security state, in response to the user response, of a plurality of security states of the mobile computing device; and transition from the first device security state to a different one of the plurality of security states of the mobile computing device based on at least a change in the context state of the mobile computing device, wherein the change in the context state of the mobile computing device indicates that the mobile computing device is not presently in a pocket, in a handbag, or otherwise carried by a user of the mobile computing device.

2. The one or more non-transitory, computer-readable storage media of claim 1, wherein to transition from the first device security state to the different one of the plurality of security states of the mobile computing device comprises to transition from the first device security state to a different one of the plurality of security states of the mobile computing device based on at least (i) a present user authentication state and (ii) the context state.

3. The one or more non-transitory, computer-readable storage media of claim 1, wherein to transition from the first device security state to the different one of the plurality of security states of the mobile computing device comprises to transition from the first device security state to a different one of the plurality of security states of the mobile computing device in response to the context data indicative that the mobile computing device is no longer carried by the user.

4. The one or more non-transitory, computer-readable storage media of claim 1, wherein to prompt the user to enter a response to a user authentication challenge comprises to prompt the user to enter a response to a user authentication challenge in response to the context data indicative that the mobile computing device is no longer carried by the user.

5. The one or more non-transitory, computer-readable storage media of claim 1, wherein to transition from the first device security state to the different one of the plurality of security states of the mobile computing device comprises to transition from the first device security state to a different one of the plurality of security states of the mobile computing device in response to the context data indicative that the mobile computing device is presently in the pocket, in the handbag, or otherwise carried by the user.

6. The one or more non-transitory, computer-readable storage media of claim 5, wherein the plurality of instructions, when executed, further cause the mobile computing device to not prompt the user to enter a response to a user authentication challenge while in the different one of the plurality of security states.

7. The one or more non-transitory, computer-readable storage media of claim 1, wherein to determine the context state of the mobile computing device comprises to determine the context state of the mobile computing device based on sensor data from an accelerometer of the mobile computing device.

8. The one or more non-transitory, computer-readable storage media of claim 7, wherein to determine the context state of the mobile computing device comprises to determine a context state indicative of whether the mobile computing device is presently carried by the user based on the sensor data from the accelerometer.

9. The one or more non-transitory, computer-readable storage media of claim 1, wherein the context state is to indicate whether the mobile computing device is presently carried by the user or another person, and wherein to transition from the first device security state to the different one of the plurality of security states of the mobile computing device comprises to transition from the first device security state to a different one of the plurality of security states of the mobile computing device in response to the context state indicative that the mobile computing device is no longer carried by either the user or the another person.

10. The one or more non-transitory, computer-readable storage media of claim 1, wherein the plurality of instructions, when executed, further cause the mobile computing device to perform a security function based on the different one of the plurality of security states.

11. A method for authenticating a user of a mobile computing device, the method comprising:

determining a context state of a mobile computing device based on sensor data comprising orientation data and motion data from one or more sensors of the mobile computing device, wherein the context state indicates whether the mobile computing device is presently in a pocket, in a handbag, or otherwise carried by a user of the mobile computing device and wherein the orientation data is indicative of an orientation of the mobile computing device and the motion data is indicative of a motion of the mobile computing device;

prompting the user to enter a response to a user authentication challenge;

entering a first device security state, in response to the user response, of a plurality of security states of the mobile computing device; and transitioning from the first device security state to a different one of the plurality of security states of the mobile computing device based on at least a change in the context state of the mobile computing device, wherein the change in the context state of the mobile computing device indicates that the mobile computing device is not presently in a pocket, in a handbag, or otherwise carried by a user of the mobile computing device.

12. The method of claim 11, wherein transitioning from the first device security state to the different one of the plurality of security states of the mobile computing device comprises transitioning from the first device security state to a different one of the plurality of security states of the mobile computing device based on at least (i) a present user authentication state and (ii) the context state.

13. The method of claim 11, wherein transitioning from the first device security state to the different one of the plurality of security states of the mobile computing device comprises transitioning from the first device security state to a different one of the plurality of security states of the mobile computing device in response to the context data indicative that the mobile computing device is no longer carried by the user.

14. The method of claim 11, wherein prompting the user to enter a response to a user authentication challenge comprises prompting the user to enter a response to a user authentication challenge in response to the context data indicative that the mobile computing device is no longer carried by the user.

15. The method of claim 11, wherein transitioning from the first device security state to the different one of the plurality of security states of the mobile computing device comprises transitioning from the first device security state to a different one of the plurality of security states of the mobile computing device in response to the context data indicative that the mobile computing device is presently in the pocket, in the handbag, or otherwise carried by the user.

16. The method of claim 15, further comprising not prompting the user to enter a response to a user authentication challenge while in the different one of the plurality of security states.

17. The method of claim 11, wherein determining the context state of the mobile computing device comprises determining the context state of the mobile computing device based on sensor data from an accelerometer of the mobile computing device.

18. The method of claim 17, wherein determining the context state of the mobile computing device comprises determining a context state indicative of whether the mobile computing device is presently carried by the user based on the sensor data from the accelerometer.

19. The method of claim 11, wherein the context state is to indicate whether the mobile computing device is presently carried by the user or another person, and wherein transitioning from the first device security state to the different one of the plurality of security states of the mobile computing device comprises transitioning from the first device security state to a different one of the plurality of security states of the mobile computing device in response to the context state indicative that the mobile computing device is no longer carried by either the user or the another person.

20. The method of claim 11, further comprising performing a security function based on the different one of the plurality of security states.

* * * * *